(12) United States Patent
Bradfield

(10) Patent No.: US 9,444,306 B2
(45) Date of Patent: Sep. 13, 2016

(54) VARIABLE FLUX ELECTRIC STARTER MOTOR AND METHOD OF OPERATING THE SAME

(75) Inventor: Michael D. Bradfield, Anderson, IN (US)

(73) Assignee: REMY TECHNOLOGIES, L.L.C., Pendleton, IN (US)

(*) Notice: Subject to any disclaimer, the term of this patent is extended or adjusted under 35 U.S.C. 154(b) by 466 days.

(21) Appl. No.: 13/481,092

(22) Filed: May 25, 2012

(65) Prior Publication Data

US 2013/0300130 A1 Nov. 14, 2013

Related U.S. Application Data

(63) Continuation of application No. 13/466,469, filed on May 8, 2012, now abandoned.

(51) Int. Cl.
| | |
|---|---|
| H02K 3/28 | (2006.01) |
| H02K 23/10 | (2006.01) |
| F02N 11/08 | (2006.01) |
| H02K 7/116 | (2006.01) |
| H02K 7/108 | (2006.01) |
| F02N 15/02 | (2006.01) |
| F02N 15/04 | (2006.01) |
| F02N 15/06 | (2006.01) |

(52) U.S. Cl.
CPC ............. *H02K 7/116* (2013.01); *F02N 11/087* (2013.01); *H02K 3/28* (2013.01); *H02K 7/1085* (2013.01); *H02K 23/10* (2013.01); *F02N 15/022* (2013.01); *F02N 15/046* (2013.01); *F02N 15/067* (2013.01)

(58) Field of Classification Search
CPC .................... F02N 11/00–11/087; H02K 3/28

USPC ................ 310/184; 318/772, 778; 290/38 R; 123/179

See application file for complete search history.

(56) References Cited

U.S. PATENT DOCUMENTS

| | | | |
|---|---|---|---|
| 3,757,150 A | 9/1973 | Benezech | |
| 3,774,062 A * | 11/1973 | Johnson | ........................ 310/184 |
| 4,295,069 A | 10/1981 | Givan et al. | |
| 4,899,074 A | 2/1990 | West | |
| 5,087,845 A | 2/1992 | Behrens et al. | |
| 5,212,435 A | 5/1993 | Dutro | |
| 5,691,591 A | 11/1997 | McCann | |
| 5,892,421 A * | 4/1999 | Matsushima | ................. 335/126 |

(Continued)

FOREIGN PATENT DOCUMENTS

| | | | |
|---|---|---|---|
| FR | 2803632 A1 * | 7/2001 | |
| JP | 2004257369 A | 9/2004 | |
| JP | 2005160278 A | 6/2005 | |

OTHER PUBLICATIONS

Machine Translation, Vilou, FR 2803632 A1, Jul. 13, 2001.*

(Continued)

*Primary Examiner* — Thomas Truong
(74) *Attorney, Agent, or Firm* — Cantor Colburn LLP

(57) ABSTRACT

A variable flux electric starter motor includes a frame, an armature rotatably mounted within the frame, and a primary field mounted to the frame. The primary field includes a plurality of primary windings electrically connected one to another. A relay is electrically coupled to at least one of the plurality of poles. A supplemental field is mounted to the frame. The supplemental field includes a supplemental winding electrically connected in parallel to the plurality of primary windings.

10 Claims, 6 Drawing Sheets

(56) References Cited

U.S. PATENT DOCUMENTS

| | | |
|---|---|---|
| 6,342,746 B1 | 1/2002 | Flynn |
| 6,541,887 B2 | 4/2003 | Kawamura |
| 6,995,490 B2 | 2/2006 | Lakerdas et al. |
| 7,078,843 B2 | 7/2006 | Du et al. |
| 7,112,907 B2 | 9/2006 | Lakerdas et al. |
| 7,746,025 B2 * | 6/2010 | Choi et al. .................. 318/772 |
| 8,076,811 B2 | 12/2011 | Zhu et al. |
| 2003/0094929 A1 | 5/2003 | Pendell |
| 2004/0027078 A1 * | 2/2004 | Xu et al. ..................... 318/107 |
| 2005/0017670 A1 | 1/2005 | Han et al. |
| 2009/0026896 A1 | 1/2009 | Andoh |

OTHER PUBLICATIONS

International Search Report and Written Opinion for PCT Application No. PCT/US2013/038336, dated Aug. 26, 2013, pp. 1-9.
International Search Report and Written Opinion for PCT Application No. PCT/US2013/041554, dated Aug. 27, 2013, pp. 1-10.

* cited by examiner

VARIABLE FLUX ELECTRIC STARTER MOTOR AND METHOD OF OPERATING THE SAME

CROSS REFERENCE TO RELATED APPLICATION

This is a continuation application related to U.S. application Ser. No. 13/466,469 filed May 8, 2012, the disclosure of which is incorporated by reference herein in its entirety.

BACKGROUND OF THE INVENTION

Exemplary embodiments pertain to the art of electric starter motors and, more particularly, to a variable flux electric starter motor.

Vehicles that employ internal combustion engines generally include a starter motor. In most cases, vehicles employ an electric starter motor to initiate operation of the internal combustion engine. The electric starter motor includes an armature that rotates in response to a magnetic motive force that is set up between armature windings and provided by a stationary field. The armature is coupled to a pinion gear that is configured to engage with a ring gear on the internal combustion engine. A solenoid drives the pinion gear into the ring gear to start the internal combustion engine.

BRIEF DESCRIPTION OF THE INVENTION

Disclosed is a variable flux electric starter motor including a frame, an armature rotatably mounted within the frame, and a primary field mounted to the frame. The primary field includes a plurality of primary windings electrically connected one to another. A relay is electrically coupled to at least one of the plurality of poles. A supplemental field is mounted to the frame. The supplemental field includes a supplemental winding electrically connected in parallel to the plurality of primary windings.

Also disclosed is a method of operating a variable flux electric starter motor. The method includes passing an electrical current through a primary field having a plurality of primary windings electrically connected one to another to generate a first flux, rotating an armature at a first speed in response to the first flux, shorting at least one of the plurality of primary windings to generate a second flux, rotating the armature at a second speed that is greater than the first speed in response to the second flux, and limiting the second speed by directing electrical current through a supplemental winding of a supplemental field electrically coupled in parallel to the primary field.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
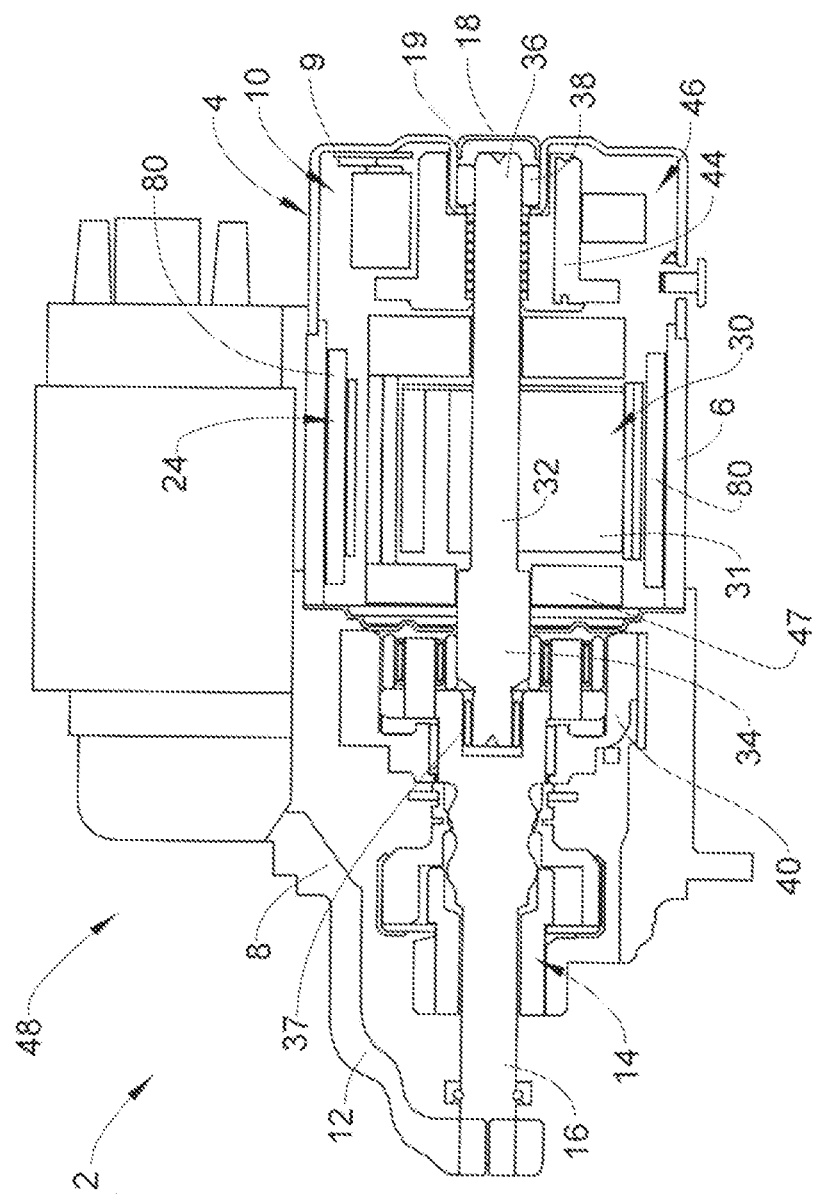
FIG. 1 depicts a partial cross-sectional side view of a variable flux electric starter motor in accordance with an exemplary embodiment.

A variable flux electric starter motor in accordance with an exemplary embodiment is indicated generally at 2 in FIG. 1. Starter motor 2 includes a frame 4 having a wall 6. Wall 6 includes a first end 8 that extends to a second end 9. Wall 6 defines an interior portion 10. In the exemplary aspect shown, starter motor 2 includes a pinion housing 12 arranged at first end 8. Pinion housing 12 surrounds, in part, a pinion gear 14 rotatably mounted to a pinion gear shaft 16. An end plate 18 is mounted at second end 9. End plate 18 includes a recessed portion 19. Starter motor 2 is also shown to include a field assembly 24 mounted to an inner surface (not separately labeled) of wall 6, and a rotor or armature assembly 30.

Armature assembly 30 includes an armature core 31 supported upon an armature shaft 32. Armature core 31 is spaced from field assembly 24 by an air gap (not separately labeled). Armature shaft 32 includes a first end portion 34 that extends to a second end portion 36. First end portion 34 is supported by a bearing 37 provided within a recess (not separately labeled) of pinion gear shaft 16, while second end portion 36 is supported by a bearing 38 arranged within recessed 19. First end portion 34 of armature shaft 32 is operably coupled to pinion gear 14 through a gear assembly 40. Armature assembly 30 is also shown to include a commutator 44 that is coupled to a brush assembly 46. Brush assembly 46 delivers electrical current to armature windings 47 via commutator 44. The electrical current flowing through armature windings 47 interact with field assembly 24 to set up a magnetic motive force (MMF). The MMF sets up a flux within the air gap between armature core 31 and field assembly 24. The flux interacts with current flowing through armature core 31 causing armature assembly 30 to rotate within frame 4. The rotation of armature assembly 30 is translated to pinion gear 14 through gear assembly 40. A solenoid 48 shifts pinion gear 14 along pinion gear shaft 16 into engagement with a ring gear (not shown) that is typically provided on a flywheel of an internal combustion engine (also not shown).

Figure 2:
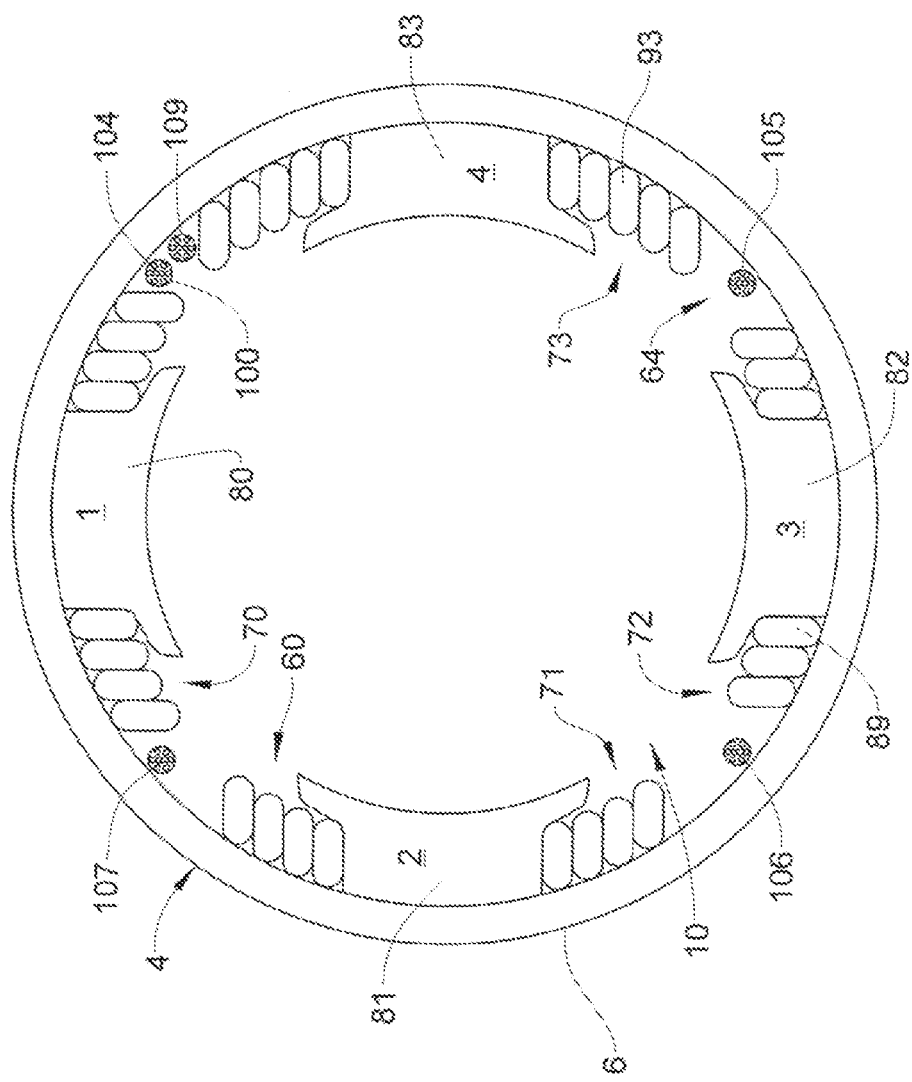
FIG. 2 depicts a partial cross-sectional end view of the variable flux electric starter motor of FIG. 1.
Figure 3:
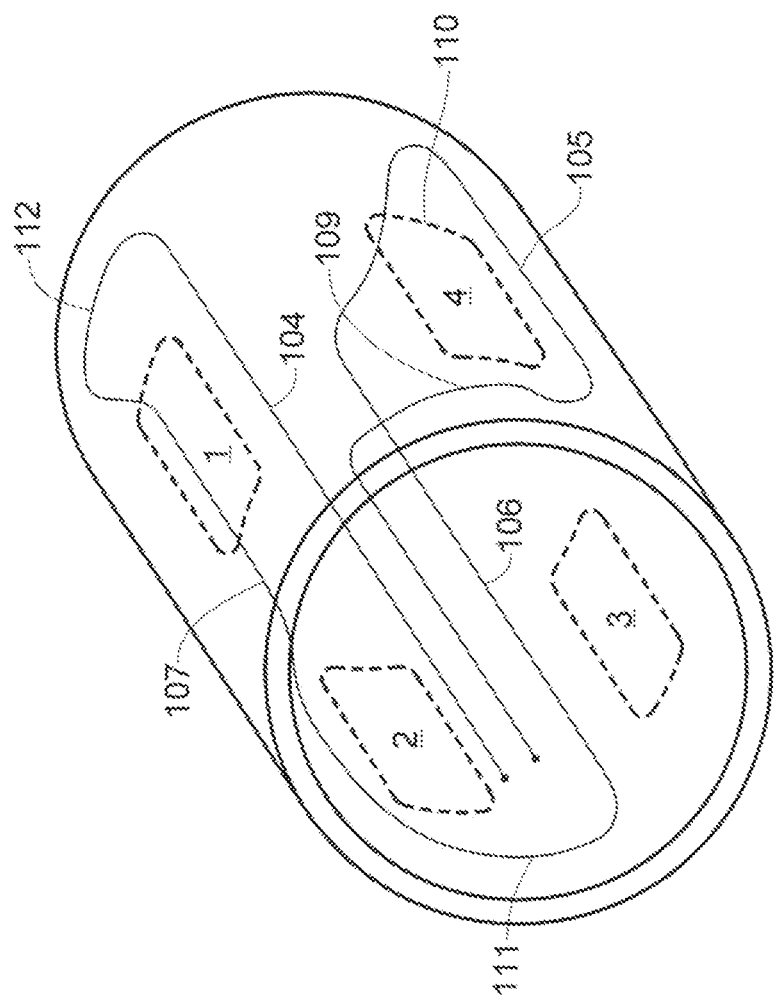
FIG. 3 depicts a partial perspective view of a supplemental field arranged in a frame of the variable flux electric starter motor of FIG. 2.

In accordance with an exemplary embodiment, field assembly 24, includes a primary field 60 and a secondary or supplemental field 64 as shown in FIG. 2. Primary field 60 includes a first primary winding 70, a second primary winding 71, a third primary winding 72, and a fourth primary winding 73. Starter motor 2 includes a first pole shoe 80, a second pole shoe 81 spaced about 90° from first pole shoe 80, a third pole shoe 82 spaced about 90° from second pole shoe 81, and a fourth pole shoe 83 spaced about 90° from first pole shoe 80 and third pole shoe 82 thereby defining a four pole system. Pole shoes 80-83 are mounted to an inner surface (not separately labeled) of wall 6. First primary winding 70 loops about first pole shoe 80. Second primary winding 71 loops about second pole shoe 81. Third primary winding 72 loops about third pole shoe 82. Fourth primary winding 73 loops about fourth pole shoe 83.

In accordance with one aspect of the exemplary embodiment, first and second primary windings 70, 71 include an identical number of windings. More specifically, first primary windings 70 and second primary windings 71 include an equal number of turns. In contrast, third and fourth primary windings 72, 73 include a different number of windings. In addition, third and fourth primary windings 72, 73 include a different number of windings than first and second primary windings 70, 71. In accordance with one aspect of the exemplary embodiment, third primary windings 72 include fewer turns that first and second primary windings 70 and 71 and fourth primary windings 73 include a greater number of turns than first and second primary windings 70 and 71. In further accordance with an exemplary aspect, third primary windings 72 include one less turn than first and second primary windings 70 and 71, and fourth primary windings 73 includes one more turn than first and second primary windings 70 and 71. In accordance with one exemplary aspect, first and second primary windings 70 and 71 each include four (4) turns, third primary windings 72 includes three (3) turns, and fourth primary windings 73 includes five (turns). The differing number of turns in third and fourth primary windings 72 and 73 contributes to a speed limiting feature of the exemplary embodiment as will be detailed more fully below. However, it should be understood that the number of turns may vary. In addition, it should be understood that each primary winding 70-73 may include a different number of turns.

Figure 4:
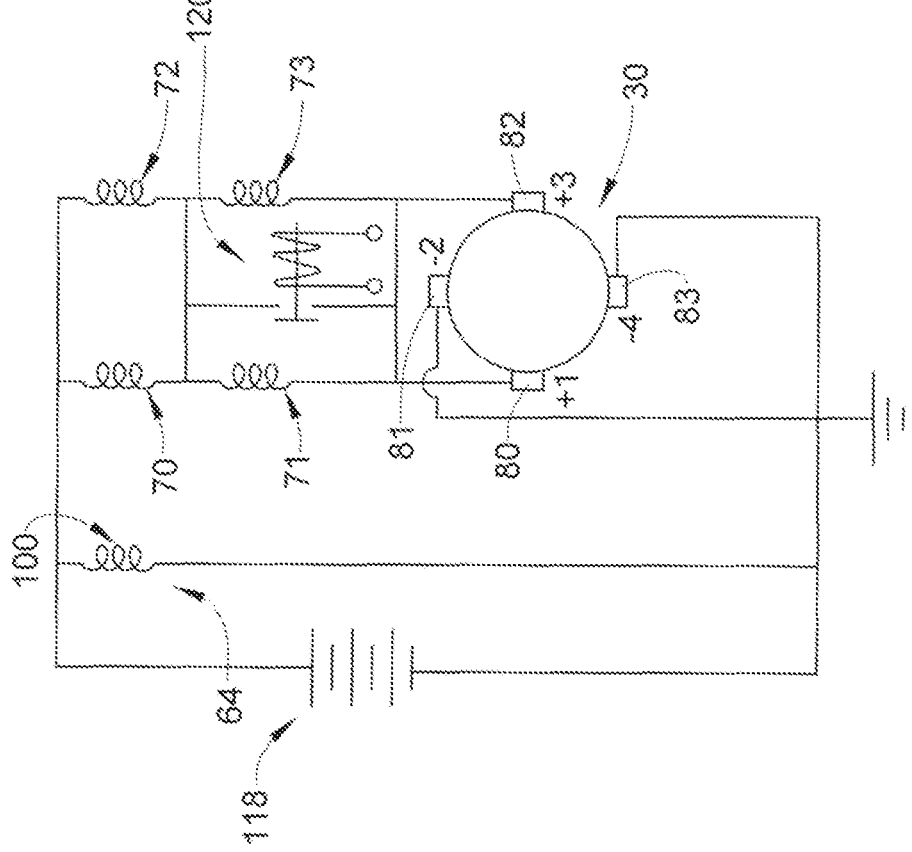
FIG. 4 depicts a wiring diagram illustrating primary and supplemental field connections of the variable flux electric starter motor of FIG. 2.

In further accordance with an exemplary embodiment, supplemental field 64 defines a single supplemental winding 100 having a first axial pole leg 104, a second axial pole leg 105, a third axial pole leg 106, and a fourth axial pole leg 107. As will be discussed more fully below, supplemental field 64 provides an excitation to one or more of primary windings 70-73. In accordance with one aspect of the exemplary embodiment, supplemental field 64 may be arranged to provide an excitation to two of primary windings 70-73. In accordance with another aspect of the exemplary embodiment, supplemental field 64 may be arranged to provide excitation to each of primary windings 70-73. The number of primary windings acted upon by supplemental field 64 may vary. First and second axial pole legs 104 and 105 are joined through a first circumferential pole leg 109. Second and third axial pole legs 105 and 106 are joined through a second circumferential pole leg 110. Third and fourth axial pole legs 106 and 107 are joined through a third circumferential pole leg 111, and fourth and first axial pole legs 107 and 104 are joined through a fourth circumferential pole leg 112. At this time it should be understood that the term axial pole leg describes a pole leg that extends along an axis of starter motor 2, and the term circumferential pole leg describes a pole leg that extends along a circumference of starter motor 2. As shown in FIG. 4, first, second, third, and fourth primary windings 70-73 are electrically coupled to a power source 118. First and second primary windings 70 and 71 are electrically coupled in series. Likewise, third and fourth primary windings 72 and 73 are electrically coupled in series. First and second primary windings 70 and 71 are coupled in parallel to third and fourth primary windings 72 and 73. Supplemental field 64 is connected in parallel to first, second, third, and fourth primary windings 70-73. As will be discussed more fully below, supplemental field 64 establishes a relatively weak field that provides a speed limiting effect on armature assembly 30.

Figure 5:
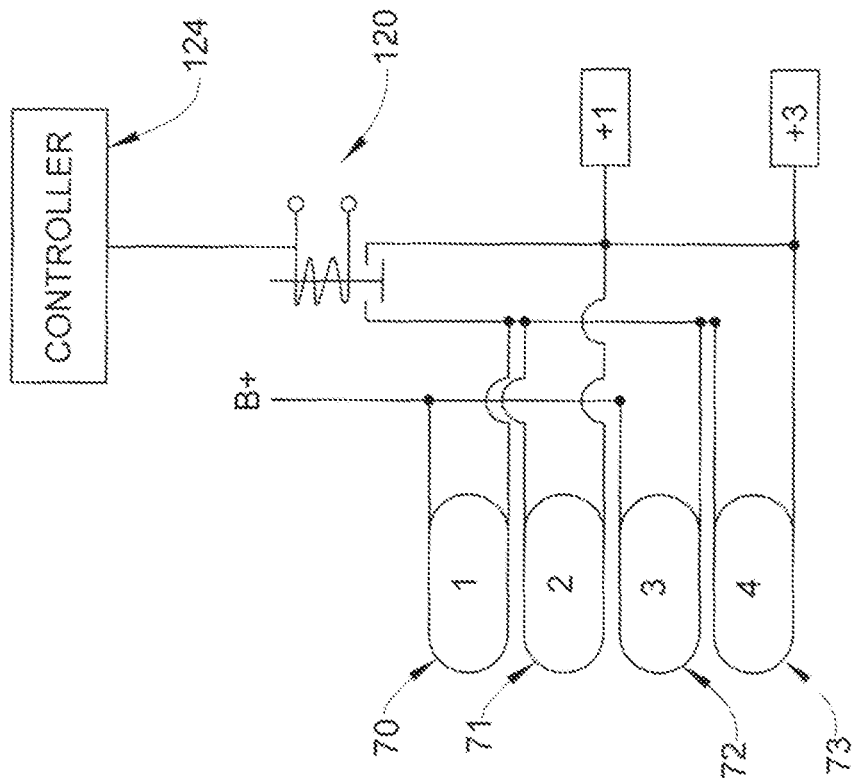
FIG. 5 depicts a circuit diagram of the primary field connections of the variable flux electric starter motor of FIG. 2.

In still further accordance with the exemplary embodiment, starter motor 2 includes a relay 120 operatively connected to a controller 124 as shown in FIG. 5. Relay 120 may be bodily incorporated into starter motor 2 or may be mounted remotely. Controller 124 generally forms part of a vehicle electronic control system or ECS. As shown, relay 120 is coupled between output sections (not separately labeled) of first and third primary windings 70 and 72 and input sections (also not separately labeled) of second and fourth primary windings 71 and 73. Controller 124 will selectively activate relay 120 causing the second and fourth primary windings 71 and 73 to be shorted. By shorted, it should be understood that current, at a reduced level, continues to flow through second and fourth primary windings 71 and 73.

During cold cranking scenarios, such as during an initial motor start or following a period of rest, relay 120 remains open such that electrical current flows through first, second, third, and fourth primary windings 70-73. More specifically, electrical current flows in a manner similar to that of a conventional starter motor. Moreover, third and fourth primary windings 72 and 73, while having different numbers of turns, act in a manner similar to first and second primary windings 70 and 71 given the series connection. In other words, the number of windings that form first and second primary windings 70 and 71 is the same as the number of windings that form third and fourth primary windings 72 and 73 so as to maintain a balance within starter motor 2. More specifically, the series connection leads to electrical current flowing through first and second primary windings 70 and 71 to pass through, for example a total of eight (8) turns, and electrical current flowing through third and fourth primary windings 72 and 73 to also flow through a total of eight (8) turns to develop a first flux. During cold cranking scenarios, supplemental field 64 does not materially effect the first flux. As a result, armature assembly 30 experiences high torque, low speed response desirable for cold cranking conditions.

In contrast, during warm cranking scenarios, such as following a motor shut down at a red traffic light, or following another stopping event transition, it is desirable to achieve a faster start. Thus, controller 124 reacts to provide starter motor 2 with a second flux that leads to a lower torque, higher speed operation of armature assembly 30. More specifically, during a warm cranking scenario, controller 124 will close relay 120 causing second and fourth primary windings 71 and 73 to be shorted. However, the particular connection in starter motor 2 will result in some current flow through second and fourth primary windings 71 and 73. The actual amount of current flow will be dependent upon winding resistance as well as the resistance of relay 120. Current flow through second and third primary windings 71 and 72 will be affected by the number of turns. In one exemplary embodiment, current will pass through seven (7) turns rather than eight (8) turns.

Figure 6:
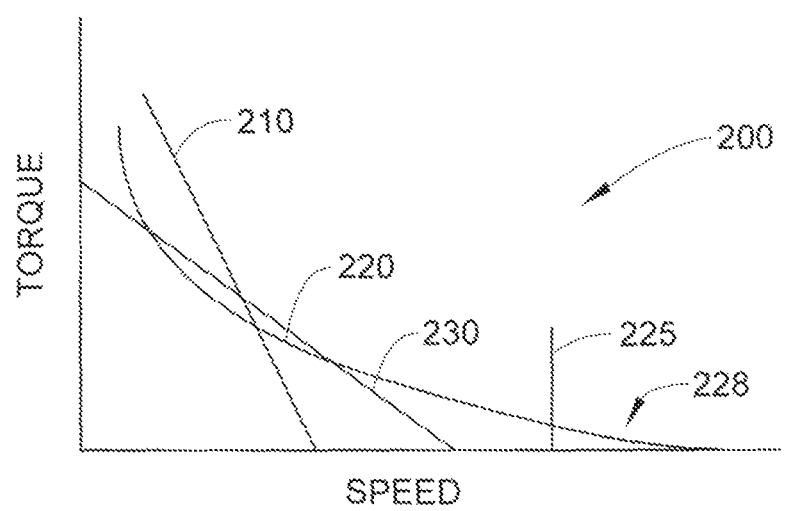
FIG. 6 depicts a Torque-Speed (T-S) graph illustrating T-S curves for standard windings, windings after application of a variable flux, and windings after application of a variable flux and a supplemental field.

The particular configuration produced by shorting second and fourth primary windings 71 and 73 results in a torque-speed curve shift that causes armature assembly 30 to experience a lower torque, higher speed response. Depending upon various design considerations, the torque-speed curve shift may lead to an over speed condition of armature assembly 30. FIG. 6 illustrates a Torque-Speed (T-S) graph 200 including a standard T-S curve 210 and a T-S curve 220 after application of a variable flux field without a supplemental field. As shown, without the addition of the supplemental field the shorting of second and fourth windings 89 and 93 may cause armature assembly 30 and, by extension, pinion gear 14, to rotate at speeds that may exceed a maximum speed set by design specifications shown at 225. More specifically, the application of a variable flux field creates a sweeping tail portion 228 on T-S curve 220 that exceeds the maximum speed for the electric motor. In order to linearize T-S curve 220 and eliminate the sweeping tail portion 228 to limit the speed experienced by armature assembly 30, a current is passed through supplemental field 64.

Current flow through supplemental field 64 produces a T-S curve such as shown at 230 that is more linearized that T-S curve 220 and also lacks the "sweeping tail". In this manner, the excitation of supplemental field trims high speed performance. More specifically, current flow through supplemental winding 100 is not linked to the series current flowing primary windings 70-73. Hence, supplemental field 64 produces a relatively weak field that limits high speed performance to below design specifications and, at the same time, slightly reduces stall torque of starter motor 2. Thus the exemplary embodiments provide a single starter motor that produces variable flux achieved through a selective application of current through windings having identical or differing numbers of turns to produce different flux fields that produce desirable torque-speed response curves for both cold cranking and warm cranking scenarios. The addition of a weak supplemental field provides a limiting effect on high speed performance of the starter motor in order to maintain pinion speeds within design constraints.

Figure 7:
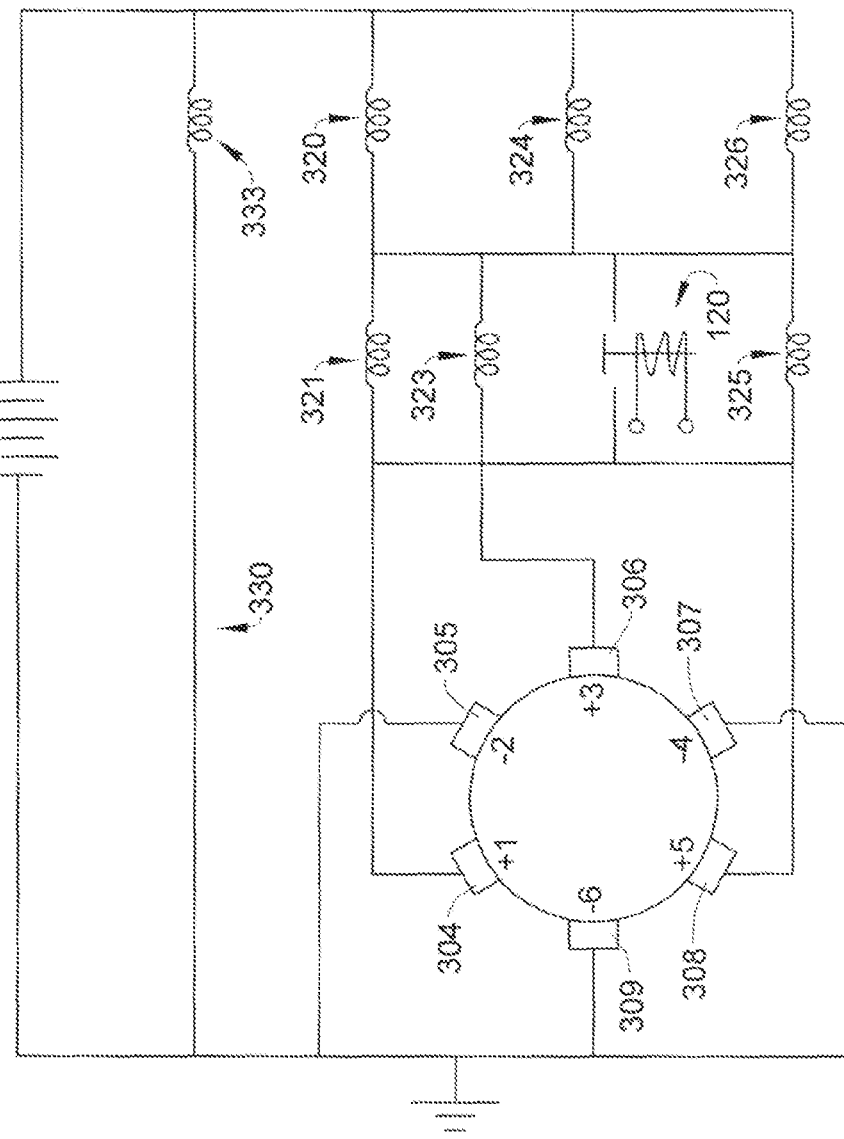
FIG. 7 depicts a wiring diagram illustrating primary and supplemental field connections of a variable flux electric motor in accordance with another aspect of the exemplary embodiment.

At this point it should be understood that the exemplary embodiments describe a single starter motor that produces variable flux achieved through a selective application of current to a supplemental field. The selective application of current to the supplemental field depends on the desired starting conditions as determined by, for example controller 124. It should also be understood that while shown and described as a four pole configuration, the number of poles in the starter motor may vary. For example, the exemplary embodiments may be incorporated into a starter motor having as few as two poles or as many as eight or more poles. FIG. 7, wherein like reference numbers represent corresponding parts in the respective views, illustrates a starter motor 300 having six poles 304-309 having corresponding primary windings 321-326 and a supplemental field 330 having a supplemental winding 333. In this configuration, relay 120 is selectively activated to create a short between windings 323 and 325 in order to cause current to flow through supplemental winding 333 and operate starter motor 300 in a manner similar to that described above.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A variable flux electric starter motor comprising:
    a frame;
    an armature rotatably mounted within the frame;
    a primary field mounted to the frame, the primary field including a plurality of primary windings electrically one to another;
    a relay electrically coupled to at least one of the plurality of primary windings;
    a supplemental field mounted to the frame, the supplemental field including a supplemental winding electrically connected in parallel to the plurality of primary windings, the supplemental field being configured and disposed to provide an excitation to one or more of the plurality of primary windings; and
    a controller operatively coupled to the relay, the controller selectively closing the relay shorting one of the plurality of primary windings causing the armature to rotate at a first non-zero speed and produce a first torque and opening the relay causing the armature to rotate at a second non-zero speed, lower than the first non-zero speed and produce a second torque, the second torque being greater than the first torque, wherein an electrical flow passes through the supplemental field regardless of the position of the relay and the electrical flow passing through the supplemental winding limits the speed experienced by the armature.

2. The variable flux electric starter motor according to claim 1, wherein the plurality of primary windings includes a first primary winding, a second primary winding, a third primary winding, and a fourth primary winding.

3. The variable flux electric starter motor according to claim 2, wherein two of the first, second, third, and fourth primary windings include an identical number of turns, and one of the first second, third, and fourth primary windings includes less than the identical number of turns.

4. The variable flux electric starter motor according to claim 3, wherein one of the first, second, third, and fourth primary windings includes more than the identical number of turns.

5. The variable flux electric stator motor according to claim 4, wherein the first and second primary windings include the identical number of turns, the third primary winding includes one less than the identical number of turns and the fourth primary winding includes one more than the identical number of turns.

6. The variable flux electric starter motor according to claim 5, wherein the relay is electrically coupled between the second primary winding and the fourth primary winding.

7. The variable flux electric starter motor according to claim 1, wherein the controller is selectively operated to close the relay causing at least one of the plurality of primary windings to be shorted.

8. The variable flux electric starter motor according to claim 1, wherein the starter motor includes four poles.

9. The variable flux electric starter motor according to claim 1, wherein the starter motor includes six poles.

10. A variable flux electric starter motor comprising:
    a frame;
    an armature rotatably mounted within the frame;
    a primary field mounted to the frame, the primary field including a plurality of primary windings electrically one to another;
    a relay electrically coupled to at least one of the plurality of primary windings;
    a supplemental field mounted to the frame, the supplemental field including a supplemental winding electrically connected in parallel to the plurality of primary windings; and
    a controller operatively coupled to the relay, the controller selectively closing the relay shorting one of the plurality of primary windings causing the armature to rotate at a first non-zero speed and produce a first torque and opening the relay causing the armature to rotate at a second non-zero speed, lower than the first non-zero speed and produce a second torque, the second torque being greater than the first torque, wherein an electrical flow passes through the supplemental field regardless of the position of the relay and the electrical flow passing through the supplemental winding limits the speed experienced by the armature, and wherein the controller is configured to close the relay following one of a motor shut down at a red traffic light and another stopping event transition, and open the relay for cold starts.

* * * * *